(12) United States Patent
Neet (10) Patent No.: US 7,081,697 B2
(45) Date of Patent: Jul. 25, 2006

(54) DYNAMOELECTRIC MACHINE STATOR CORE WITH MINI CAPS

(75) Inventor: Kirk E. Neet, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 28 days.

(21) Appl. No.: 10/869,740

(22) Filed: Jun. 16, 2004

(65) Prior Publication Data

US 2005/0280327 A1    Dec. 22, 2005

(51) Int. Cl.
*H02K 1/00* (2006.01)
(52) U.S. Cl. .................. 310/216; 310/201; 310/215
(58) Field of Classification Search ............... 310/201, 310/208, 216, 186, 195, 215, 184
See application file for complete search history.

(56) References Cited

U.S. PATENT DOCUMENTS

| | | | |
|---|---|---|---|
| 2,173,726 A | 9/1939 | Prindle | |
| 2,465,296 A | 3/1949 | Swiss | |
| 2,508,850 A | 5/1950 | Wirth | |
| 2,778,964 A | 1/1957 | Balke | |
| 3,333,330 A | 8/1967 | Linkous | |
| 3,456,142 A | 7/1969 | Larsen | |
| 4,400,639 A * | 8/1983 | Kobayashi et al. | 310/215 |
| 4,922,165 A | 5/1990 | Crawford et al. | |
| 5,763,978 A * | 6/1998 | Uchida et al. | 310/215 |
| 6,137,201 A * | 10/2000 | Umeda et al. | 310/179 |
| 6,342,740 B1 * | 1/2002 | Mabuchi | 310/40 MM |
| 6,661,140 B1 | 12/2003 | Agnes et al. | |
| 6,664,695 B1 | 12/2003 | Asao et al. | |
| 6,664,703 B1 * | 12/2003 | Oketani et al. | 310/254 |
| 6,674,211 B1 | 1/2004 | Katou et al. | |
| 6,940,202 B1 * | 9/2005 | Chen et al. | 310/184 |
| 2003/0071534 A1 | 4/2003 | Kreuzer et al. | |

\* cited by examiner

*Primary Examiner*—Tran Nguyen
(74) *Attorney, Agent, or Firm*—Brinks Hofer Gilson & Lione (57) ABSTRACT

A stator assembly for a dynamoelectric machine in accordance with the present invention includes a generally cylindrically-shaped stator core having a plurality of core slots formed along the inner surface thereof and defined by a radial depth and wherein a stator coil is disposed. The plurality of core slots defines a plurality of teeth therebetween, which have caps along the inner surface of the stator core and are connected to the stator core by a yoke portion. The plurality of core slots is lined along respective inner surfaces by a plurality of insulation slot liners. The teeth caps include projections along an inner diameter of the plurality of core slots. The slot openings are delimited by the projections along the stator inner diameter. These projections are substantially equal to a width of the slot liners, and are such that the delimited slot openings are substantially equal to a width of a conductor wire to be inserted into the lined core slots. A stator winding includes slot wire segments that are received by the slot liners, which may be formed in at least one row of slot wire segments.

29 Claims, 5 Drawing Sheets

DYNAMOELECTRIC MACHINE STATOR CORE WITH MINI CAPS

BACKGROUND

The present invention relates generally to stators for vehicle dynamoelectric machines and, in particular, to a stator assembly for a dynamoelectric machine having small slot openings or mini caps that accepts radial insertion of rectangular wire for the stator winding.

Dynamoelectric machines, such as electric motors, or alternators are well-known. Alternators, generally automotive alternators, typically are composed of a stator assembly fixedly supported by an alternator housing and a rotor assembly supported coaxially within the stator assembly. The stator assembly includes a generally cylindrically-shaped stator core having a plurality of core slots formed along the inner surface thereof and a stator coil disposed in the core slots. The core slots define a plurality of teeth therebetween. The teeth are connected to the core by a yoke portion.

The stator coil is formed by connecting a plurality of wires wound thereon, forming stator windings. The stator windings are accommodated at the plurality of core slots in a plurality of radially extending layers, and are formed of slot wire segments that are located in the core slots and of end loop segments that connect two adjacent slot wire segments of a phase and are formed in a predetermined multi-phase (e.g. three or six) winding pattern in the core slots of the stator core.

It is known in the art that in order to increase the output and efficiency of an alternator it is desirable to have stator winding conductors of rectangular-shaped cross sections that have slot wire segments aligned in a radial row in each core slot and whose widths, including any insulation, closely fit to the width of the main portion of the core slots, including any insulation. A slot wire segment width is defined as being closely fit to the width of the main portion of the core slot, if the ratio of the width of the slot wire segment, including any insulation, to the width of the main portion of the core slot, including any insulation, is greater than 0.6. This is advantageous because the larger conductor width reduces the electrical resistance of the stator winding, and therefore reduces the stator conductor power losses. It is also known in the art to provide a stator core with small slot openings at the inner diameter of the core, which reduces the effective air gap, to increase the alternator output. A smaller slot opening also reduces the fluctuation of magnetic flux on the rotor pole surface, which reduces eddy current losses on the rotor pole and therefore increases alternator efficiencies. It is also desirable to ease manufacturing of the stator assembly by having continuous rectangular shaped conductors to eliminate any weld operation required to connect individual U-shaped conductors axially inserted in the core slots. The term, continuous, utilized herein, refers to a conductor that is continuous for at least the majority of one circumferential pass around the stator core. However, these desirable features lead to a design contradiction in that the conductors must be large to lower the electrical resistance, must also fit closely to the width of the core slots, must be continuous conductors, must be inserted into the core slots from a radially inward position and must have a small core slot opening.

Prior art remedies typically attempted to resolve this design contradiction by utilizing continuous conductors that are small enough to enter the slot openings but do not closely fit the width of the core slots. These prior art remedies result in large voids and low slot fill factors, which leads to an alternator with low output and efficiency. Other prior art remedies utilize U-shaped conductors, which are axially inserted into the core slots and then welded together to form the finished stator windings. These other prior art remedies manage to accomplish a high slot fill factor and consequently low resistance, but encounter difficulties in the assembly of multiple insertions and welds. Other prior art remedies utilize a conductor that is inserted into a flat stator core and than the stator core and conductor assembly are coiled into the desirable annular shape. These other prior art remedies manage to accomplish a high slot fill factor and consequently low resistance, but encounter difficulties in the coiling process of the stator core and conductor assembly.

In view of the above discussed problems, it is advantageous to provide a stator having core slots that allow for conductors to be inserted from a radially inward position while also providing smaller core openings, such that a width of the inserted conductors fits closely to a width created by insulation slot liners lining an inner surface of the core slots. As a result, an alternator having high low-rpm performance and high efficiency while also being easy to assemble and manufacture is realized.

BRIEF SUMMARY

A stator assembly for an alternator embodying the principles of the present invention includes a generally cylindrically-shaped stator core having a plurality of core slots formed along an inner surface thereof and defined by a radial depth and wherein a stator coil is disposed. Together the core slots define a plurality of teeth therebetween. The teeth include caps along the inner surface of the stator core and are connected together by a yoke portion. The core slots may be substantially rectangular shaped in cross section from a back end of the core slots to a radial outer edge of the teeth caps and extend axially between a first and a second end of the stator core. For those skilled in the art, it is known that the term rectangular, when referring to the cross section of the conductor or the core slot, includes rectangular shapes having radii between any adjacent edges.

Each of the plurality of core slots is lined along its respective inner surfaces by insulation slot liners. Each of the insulating slot liners has a pair of leg members extending from the back end of the core slots to a location, which is just outwardly adjacent to the radial outer edges of the corresponding caps. At the inner diameter of the stator, the teeth caps include projections, which extend in the circumferential direction. These cap projections delimit slot openings along the inner diameter of the stator that are smaller in width than the main portion of the core slot. The delimited slot openings have a width substantially equal to or slightly larger than a width of a conductor wire to be inserted into the core slots. Within the core slots, a stator winding includes slot wire segments that are received by the slot liners and which may be provided in at least one row.

Further aspects and advantages of the invention are described below in conjunction with the present embodiments. This description summarizes some aspects of the present embodiments and should not be used to limit the claims.

BRIEF DESCRIPTION OF THE DRAWINGS

The invention, together with the advantages thereof, will be understood by reference to the following description in conjunction with the accompanying figures, which illustrate some embodiments of the invention.

DETAILED DESCRIPTION OF THE PREFERRED EMBODIMENT

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Typically, an alternator includes a stator, a rotor, a frame, a brush unit, a rectifier unit and a rear cover. The stator includes a stator core having a plurality of core slots, a stator winding accommodated in the core slots and a plurality of insulation members insulating the stator winding. The frame accommodates the stator and the rotor and supports the rotor so as to rotate on the rotary shaft. Typically, the frame supports the stator around the rotor so that the inner periphery of the stator faces the outer periphery of the pole core of the rotor at a suitable gap. In some applications, the frame may conversely support the rotor about the stator.

Figure 1:
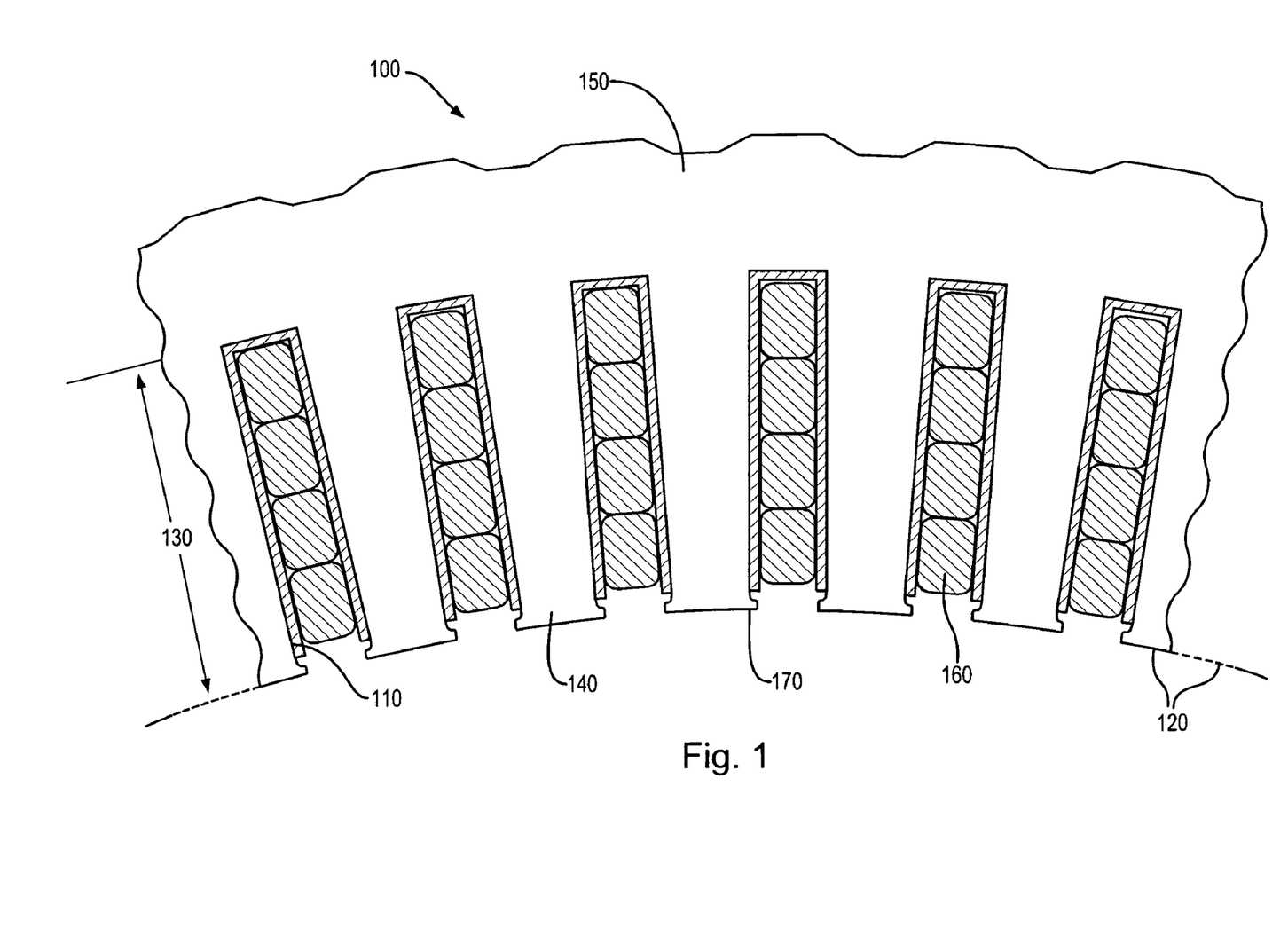
FIG. 1 is a partial view of one embodiment of a stator core in accordance with the present invention.

Referring now to FIG. 1, illustrated therein is one embodiment of a stator core 100, in accordance with the present invention, suitable for radial insertion of continuous wires. The stator core 100 is generally cylindrically-shaped having a plurality of radially oriented core slots 110 formed around an inner surface 120 thereof and defining a radial depth 130. The core slots 110 are preferably equally spaced along the inner surface 120 of the stator core 100. The core slots 110 accordingly define a plurality of teeth 140, which are connected at their radially outward end by a yoke portion 150. The core slots 110 are substantially rectangularly shaped in cross section from a back end of the core slots 110 to a radial outer edge of the teeth caps and extend axially between a first and a second end of the stator core 100. Alternatively, the core slots 110 may be substantially square shaped or any other shape, which may allow each core slot for a close fit with correspondingly shaped wire segments 160.

The teeth 140 extend radially inward from the yoke portion 150 toward a rotor (not shown) situated substantially within the axial length of the stator core 100. Alternatively, in the event that the stator core 100 is interiorly located and surrounded by a rotor, the core slots 110 are formed in an exterior surface of the stator core 100.

Still referring to FIG. 1, typically alternator stators are formed include a cap on the stator core tooth to create a slot opening that is much smaller in width than the main portion of the core slot 110. The purpose of this smaller slot opening is to generate more power by reducing the effective air gap area and to increase alternator efficiency by reducing the fluctuating flux on the rotor pole surface, thereby reducing the eddy current losses. However, in the high slot fill alternator advancement utilizing continuous conductors which are radially inserted through the slot openings of the core slots 110 of an annular stator core 100, the slot opening cannot be made smaller than the width of the conductor. This leads to low output and low efficiency. The teeth 140 include caps 170 along the inner surface of the stator core 100. As such, the caps 170 are provided on the teeth 140 to create a slightly smaller slot opening which will increase alternator performance and efficiency.

Figure 2:
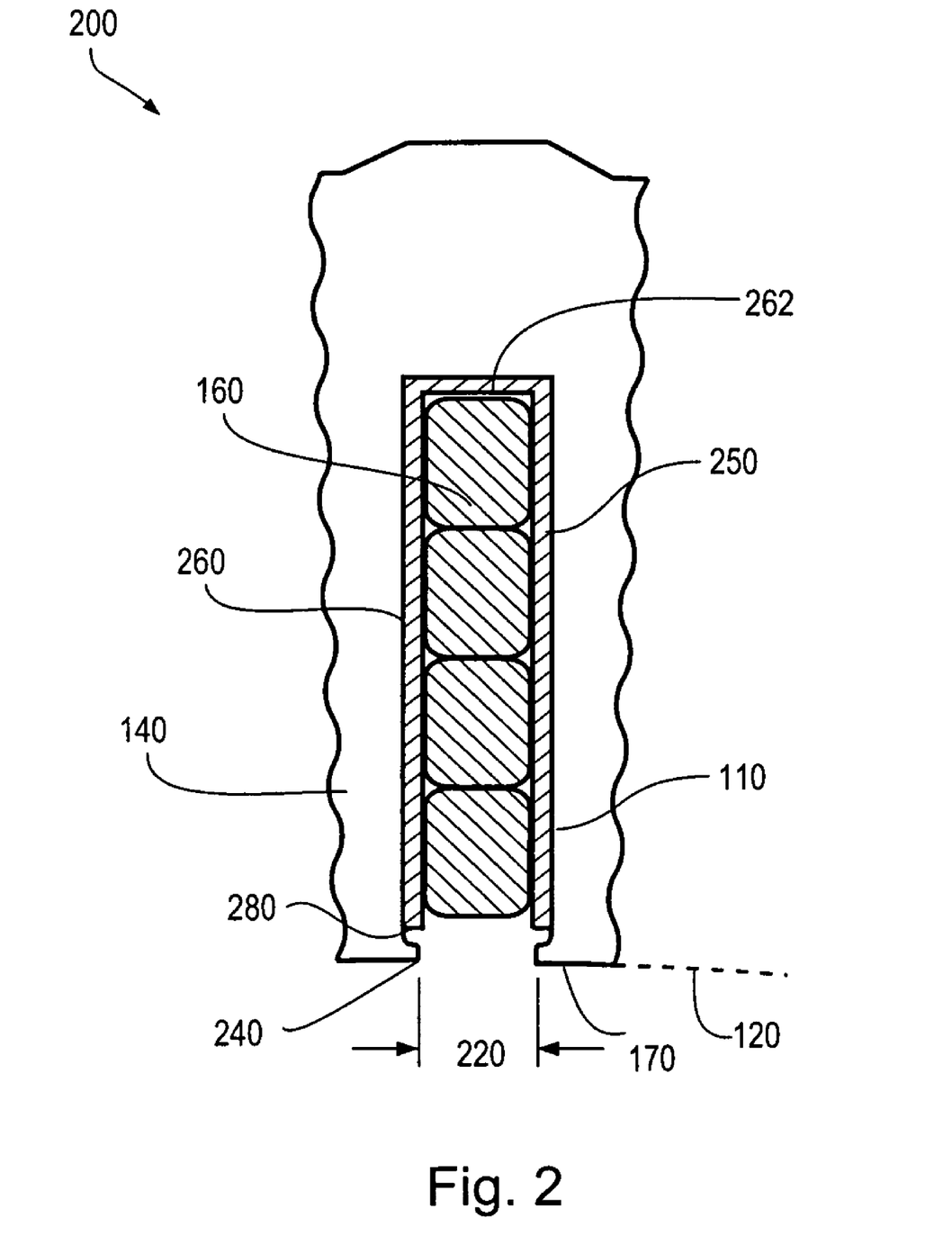
FIG. 2 is a partial view of one embodiment of a core slot from the stator of FIG. 1.

Now referring to FIG. 2, the stator core 200 includes a core slot 110 having teeth 140 with caps 170 that create a slot opening 220 between each other that is smaller in width than a main portion of the core slot 110. The slot opening 220 is defined as the opening between adjacent teeth 140 at the inner diameter of the core. The caps 170 include projections 240 along an inner diameter 120 of the stator core 200. Thus, the slot opening 220 shown in FIG. 2 is delimited along the inner surface of the stator core 200 by adjacent circumferential projections 240. As such, the slot opening 220 is substantially equal to or only slightly larger than a width of a conductor wire 160 to be inserted therebetween these projections 240.

The core slot 110 is lined along an inner surface by an insulating slot liner or insulation member 250 that may be fixedly received by the core slot 110 prior to insertion of the slot wire segments 160. The insulating slot liner 250 has a pair of leg members 260 extending from a back end 262 to the radial outer edges of the corresponding projections 240. As such, the slot liner 250 may have substantially equal leg members 260 that do not extend to the inner diameter 120 of the stator core 200. The extending leg members 260 accordingly terminate at free ends 280. The inward edges of each of the free ends 280 are preferably at a substantially equal distance from the back end 262.

Still referring to FIG. 2, opposing projections 240 define a width 220 substantially equal to a width of the slot liner 250, and are such that their respectively delimited slot opening 220 is substantially equal to or slightly larger than a width of a slot wire segment 160 to be inserted into the lined stator core slot 110. Therefore, the free ends 280, when the slot liner 250 is in the installed position, form a gap therebetween that is also substantially equal to or slightly larger than the width of the width of a conductor wire 160. A width of each of the opposing projections 240 is substantially equal to a width of the slot liner 250. The insulating slot liner 250, which may be a form of paper, paper composite, or any other form of insulation having electrically insulating properties, may be glued to the inside of the core slot 110 prior to loading the stator winding. Further, the insulating slot liner 250 may be a coating applied to the inner surface of the core slot 110. The insulating slot liner 250 may not include an extension that lines the slot opening 220 between the projections 240.

Figure 3:
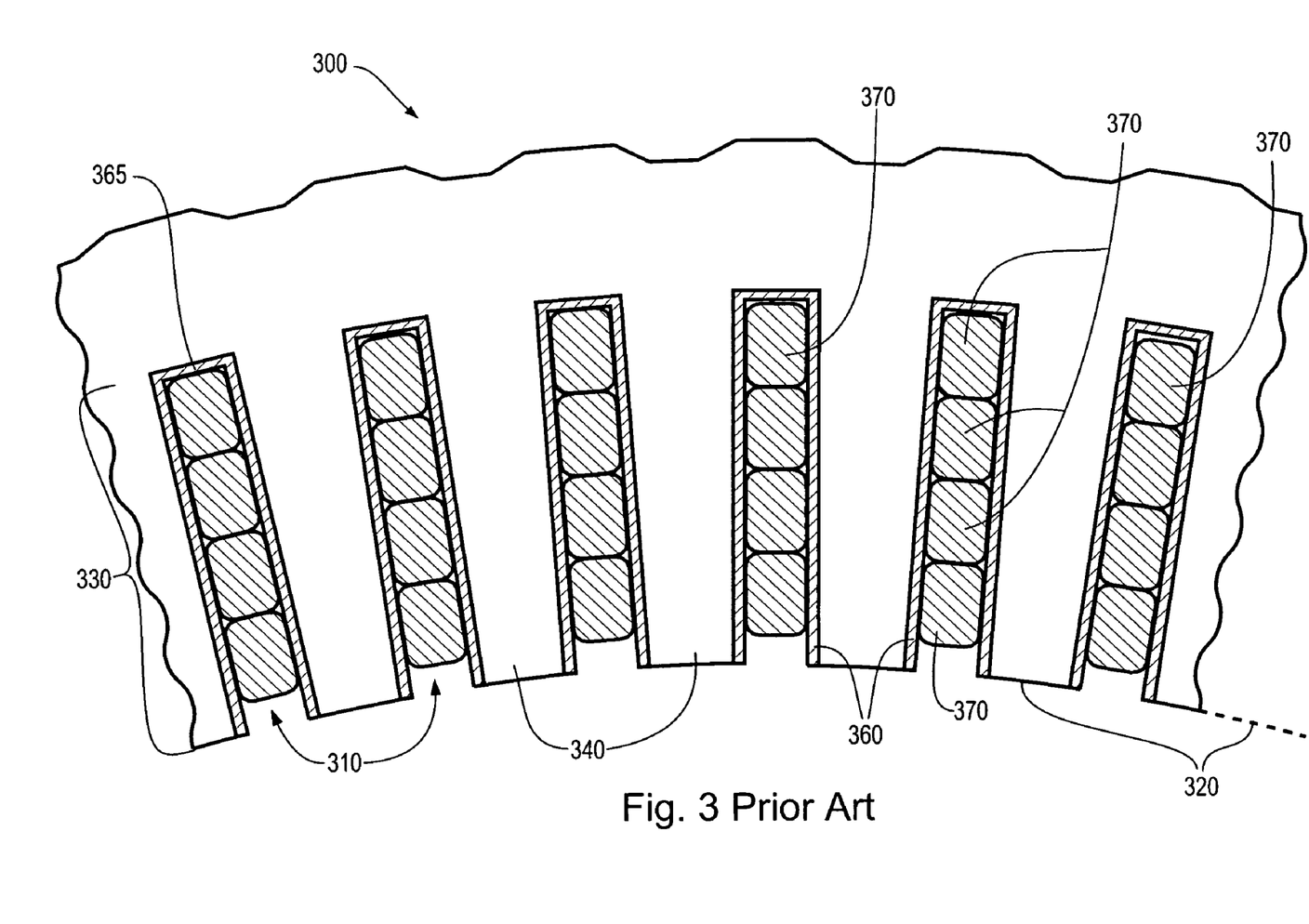
FIG. 3 is a partial view illustrating a prior art stator core.

Now referring to FIG. 3, a partial view is illustrated of one embodiment of a stator core 300, according to the prior art, designed for radial insertion of continuous wires. The stator core 300 is shown with a plurality of core slots 310 extending radially outward to an inner surface 320 thereof and defined by a radial depth 330. The core slots 310 define a plurality of teeth 340 therebetween, which are connected to one another by a yoke portion 350. The core slots 310 are substantially rectangular shaped, run the axial length of the stator core 300, and receive corresponding wire segments 370 of the winding. Thus, the teeth 340 extend radially forward from the yoke portion 350 adjacent to the rotor (not shown) situated substantially within the axial length of the stator core 300. The teeth 340 may have substantially straight walls defining the core slot 310 therebetween. The slot liners 360 extend from a back end 365 toward the inner diameter 320 of the stator core 300.

Figure 4A:
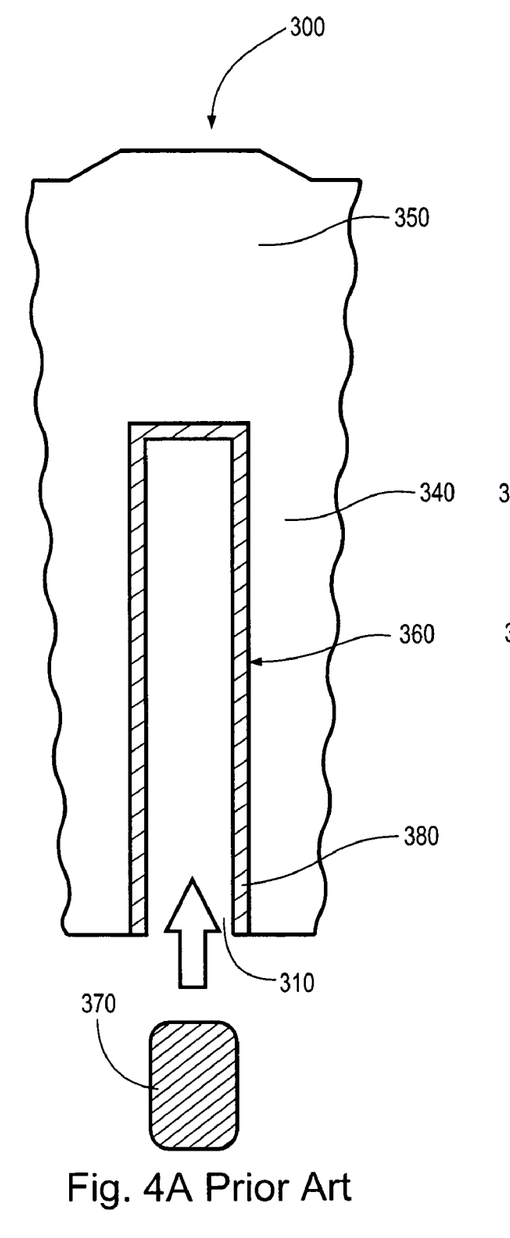
FIGS. 4a–4b are a multi-step assembly illustrating a loading disadvantage associated with the prior art.
Figure 4B:
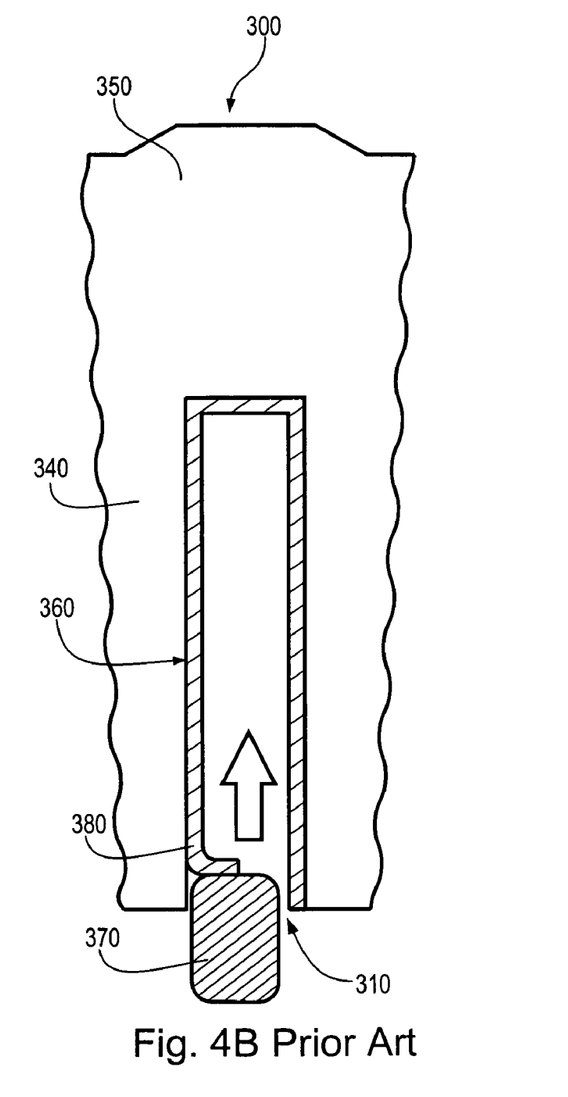

As illustrated in FIGS. 4a–4b, during the insertion process of the conductor wire segments 370 into the core slots 310, the wire segments 370 may catch the free ends 380 of the slot liner 360, thereby highlighting one disadvantage of the prior art.

Figure 5A:
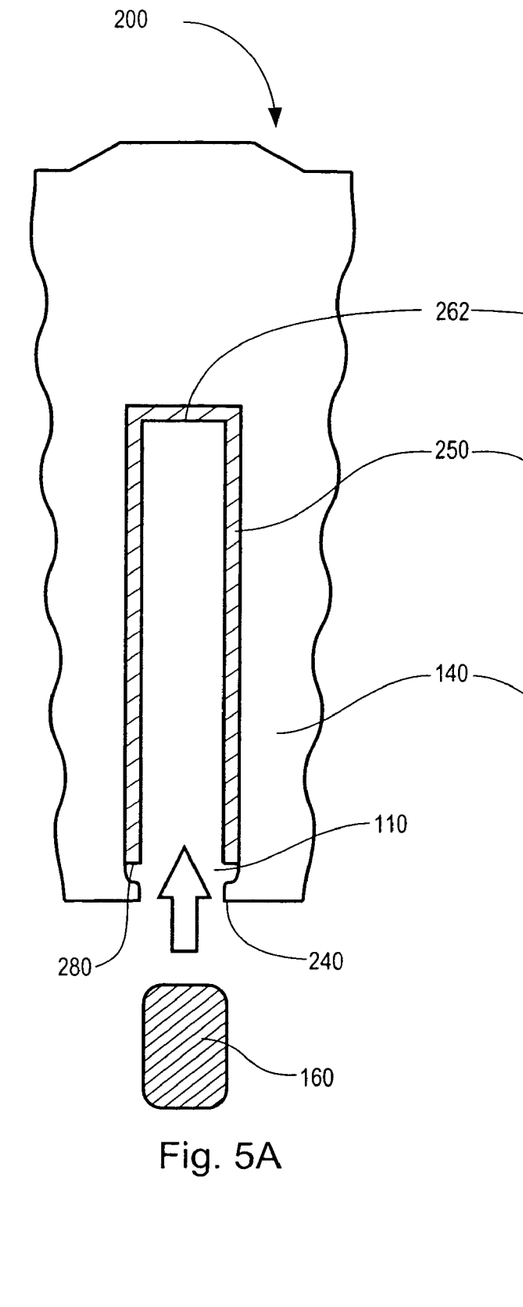
FIGS. 5a–5b are a multi-step assembly illustrating the loading of a stator core slot, in accordance with the present invention.
Figure 5B:
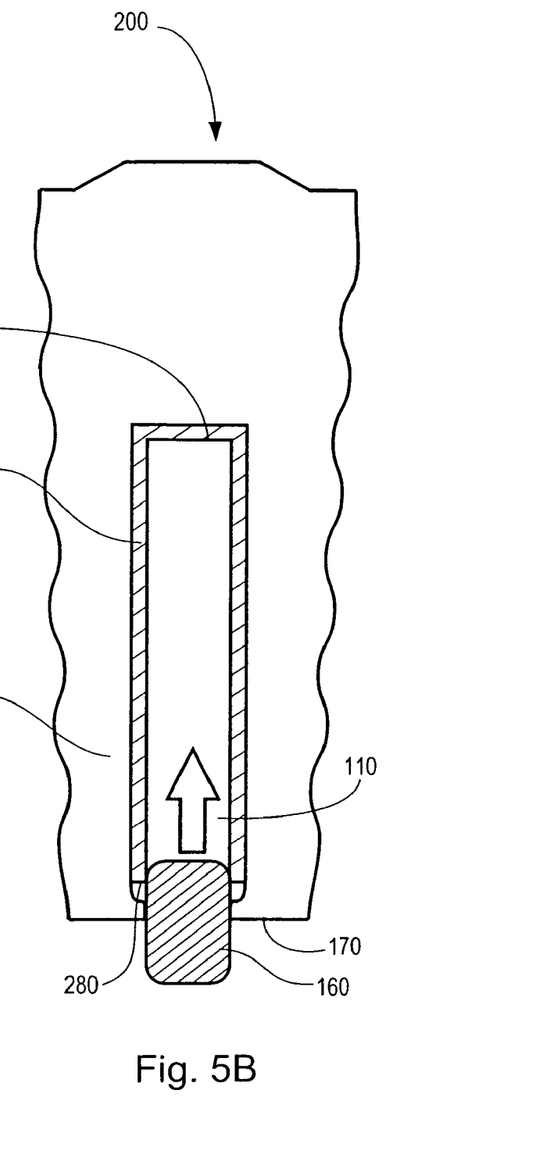

Referring to FIGS. 5a–5b, a multi-step assembly for loading slot wire segments 160 into the core slots 110, lined with insulating liners 250, in accordance with the present invention. A core slot 110 defining a portion of the stator core 200 sandwiched thereby between a pair of teeth 140, which are connected to each other by a yoke portion 150. A plurality of slot wire segments 160, typically having a rectangular cross section, is aligned in rows wherein each row is designated to be inserted into the core slot 110. For those skilled in the art, it is commonly understood that wires with rectangular cross sections include wires with square cross sections and that radii may exist on the corners of the rectangular cross sections.

Referring to 5b, a slot wire segment 160 is shown entering the core slot 110. As indicated above, the width of the slot wire segment 160 closely fits the slot opening 220 created by the opposing projections 240 of the adjacent caps 170. The width of the slot wire segment 160 also closely fits the width available internally to the core slot 110, which is already lined by the slot liner 250. Shielded by the opposing projections 240 during the insertion between the caps 170, the slot wire segment 160 does not catch on the free ends 280 of the slot liner 250.

Referring back to FIG. 2, the core slot 110 is shown filled with a respective plurality of slot wire segments 160 and with a corresponding insulation slot liner 250 therebetween. The plurality of slot wire segments 160 may be aligned in a layered row or rows. A stator winding pattern may consist of a plurality n of phases, commonly three or six, where the slot wire segments of each phase are shifted a predetermined number of slots and wherein they may be aligned in layered rows.

Once inserted and in the installed position, a predetermined number of slot wire segments 160 are located substantially radially behind the projections 240 and in contact with the slot liner 250. Thus, a high slot fill is accomplished. The insulation slot liner 250 may be adapted to be fixedly glued in the respective core slot 110, using a kind of adhesive or the like joining an outer surface of insulating slot liner 250 and the inner surface of the core slot 110. Further, in order to prevent the stator winding assembly from falling back trough the inner surface of the stator core 200 and into its inner diameter 120, the slot wire segments 160 may be varnished for bonding to the stator core 200. Typically, the slot wire segments 160 are varnished to insulate the n different phases of the stator winding. The varnishing bonds the slot wire segments 160 together and provides additional insulation along with the insulation slot liner 250, once inserted in the stator core slot 110. Alternatively, the slot wire segments 160 may be press fit into their respective stator core slots 110.

The inner surface of the stator core 200, defined by the stator core teeth 140 and their respective caps 270 presents a substantially increased surface area, which reduces the effective air gap between the stator core 200 and the rotor (not shown) and thereby increasing the alternator output. Furthermore, the smaller slot opening reduces the fluctuation of magnetic flux on the rotor pole surface which reduces eddy current losses and therefore increases alternator efficiencies. The slot wire segments 160, having a substantially rectangular shaped cross section and with widths that closely fit the width made available by the slot liners 250 provide a desirable reduction in the electrical resistance, which reduces stator winding power losses. In addition, the provision of teeth caps 170, slot liners 250, and slot wire segments 160 leads to a desirable ease and reduced time of manufacturing of the stator assembly.

A high slot fill stator is defined as a stator having a maximum cross sectional area of slot wire segments 160 and a minimum cross sectional area of non-electrical material housed in the core slots 110, as shown in FIG. 2. The non-electrical material is comprised of, but not limited to, insulation members 250, air between the slot wire segments 160 and insulation on the conductors (not shown). Typically, the insulation member 250 may have a relatively thin width—typically less than 0.18 mm. For the typical high slot fill stator, which may have six phases, a width of the core teeth 140 near a surface of the inner diameter 120, excluding the projections 240, may be approximately 2.0 mm. A width of each projection 240 may be substantially equal to the width of the insulation member 250, and consequently may be also less than 0.18 mm. Therefore, the width of the core teeth 140 at the surface of the inner diameter 120 including the projections 240 may have a width about or less than 2.36 mm (a projection 240 is located on both sides of the core teeth 140). As such, an increased surface area due to the projections 240 at the inner diameter 120, is less than or equal to 18%.

For an alternately larger stator core 200 having a large inner diameter 120, the width of the slot openings 220 is equal to or less than 2.0 mm and a width of the slot wire segments 160, including any slot wire segment insulation, is equal to approximately 1.65 mm. Therefore for this design, the ratio of width of a slot opening 220 to the width of a slot wire segment 160, including any slot wire segment insulation, is less than 1.21. For an alternately smaller stator core 200 having a smaller diameter 120, the width of the slot openings 220 is equal to or less than 1.6 mm and the width of the slot wire segments 160, including any slot wire segment insulation, may be equal to approximately 1.2 m. As such, the ratio of the width of a slot opening 220 to the width of a slot wire segment 160, including corresponding slot wire segment insulation, may be less than 1.33.

As stated earlier, the stator windings are thus formed of slot portions that are located in the slots and end loop sections that connect two adjacent slot portions of each phase and are formed in a predetermined multi-phase (e.g. three or six) winding pattern in the slots of the stator core. Typical end loop sections winding may be one of a cascade winding pattern, an interlace winding process or a hairpin conductor pattern. In another embodiment, the stator winding may also have a cascading pattern at either ends and between adjacent core slots (not shown). This cascade winding may greatly ease a task of radially inserting the slot wire segments of a winding having a plurality of phases through the slot openings and into the core slots of a core. The cascade winding is defined as having conductors of each phase that are comprised of a substantially large subset (majority) of the end loop segments such that each end loop segment connects two slot segments housed in core slots at the same substantial radial position with respect to the central axial axis of the stator core, and layers of conductors which are radially aligned and therefore allow for sequential radial insertion of layers, and a plurality of conductors for corresponding layers which are shifted or adjusted by a predetermined number of slots to form phases and which are radially aligned to allow for sequential radial insertion of the conductors for each radial layer. The term radial layer, utilized herein, is defined as a portion of a conductor that extends circumferentially around the core for a majority of one circumference having slot segments housed in the same radial location with respect to the central axial axis of the stator core.

Specific embodiments of a process for assembling an alternator stator that allows radial insertion of square wire via small slot openings, according to the present invention, have been described for the purpose of illustrating the manner in which the invention is used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. A stator assembly for a dynamoelectric machine, comprising:
   a generally cylindrically-shaped stator core having a plurality of circumferentially spaced radially-extending core teeth, adjacent core teeth defining core slots in a surface thereof and each having a respective radial depth and axial length, the core slots extending between a first and a second axial ends of the stator core; and
   a stator winding having slot wire segments received by the core slots and the slot wire segments of the stator winding and the core slots being electrically insulated from one another by insulation members,
   wherein the plurality of core teeth having projections that define slot openings between adjacent core teeth,
   wherein the core slot openings have a width that allow for a radial insertion of the slot wire segments, and the width of the slot openings is less than a width of a main portion of the core slots, and
   wherein the slot wire segments are aligned in a radial row in a plurality of core slots and whose widths, including corresponding slot wire segment insulation, closely fit to the width of the main portion of the core slots;
   a surface area at the inner diameter of the core teeth including the projections is approximately equal to or less than 20% a surface area at the inner diameter of the core teeth excluding the projections.

2. The stator assembly according to claim 1 wherein a width of the projections is substantially equal to a width of the insulation member.

3. The stator assembly according to claim 1 wherein the slot wire segments have a substantially rectangular cross section.

4. The stator assembly according to claim 1 wherein the insulation member is made from one of a paper and a paper composite having electrically insulating properties.

5. The stator assembly according to claim 1, wherein the insulation member is a coating which is applied to the inner surface of the core slots.

6. The stator assembly according to claim 1, wherein the stator winding is varnished to fixedly or adhesively be bonded to the core slots.

7. The stator assembly according to claim 1, wherein the core slots are rectangular shaped in cross section from a back end of the core slots to a radial outer edge of the projections.

8. The stator assembly according to claim 1 wherein a width of one of the projections is less than the width of the insulation member.

9. The stator assembly according to claim 1 wherein a ratio of the width of the slot openings to the width of the slot wire segments, including corresponding slot wire segment insulation, is approximately equal to or less than 1.33.

10. The stator assembly according to claim 1 wherein the slot wire segments are substantially radially inserted through the slot openings of the core slots.

11. The stator assembly according to claim 1 wherein a stator winding pattern consists of n phase conductors and at least one of the n phases is formed from a continuous conductor having corresponding slot wire segments located in the core slots and end loop segments that connect two adjacent slot wire segments belonging to the at least one of the n phases.

12. The stator according to claim 11, wherein a substantially large subset of the end loop segments define at least one radial shift adjustment per end loop segment to form a cascade winding.

13. The stator assembly according to claim 1, wherein the width of the insulation member is approximately equal to or less than 0.18 mm.

14. A stator assembly for a dynamoelectric machine, comprising:
   a generally cylindrically-shaped stator core having a plurality of circumferentially spaced radially-extending core teeth, adjacent core teeth defining core slots in a surface thereof and each having a respective radial depth, an axial length and a core slot opening, the core slots extending between a first and a second axial ends of the stator core; and
   a stator winding having slot wire segments received by the core slots and the slot wire segments of the stator winding and the core slots being electrically insulated from one another by insulation members,
   wherein the core slot openings have a width that allow for a radial insertion of the slot wire segments, and the ratio of the width of the slot openings to the width of the slot wire segments, including corresponding slot wire segment insulation, is approximately equal to or less than 1.33,
   wherein the slot wire segments are aligned in a radial row in a plurality of core slots, and whose widths, including corresponding slot wire segment insulation, closely fit to the width of a main portion of the core slots less the insulation members of the corresponding core slots.

15. The stator assembly according to claim 14 wherein the stator winding consists of n phase conductors and the phase conductors having corresponding slot wire segments located in the core slots and end loop segments that connect two adjacent slot wire segments belonging to the at least one of the n phases and a substantially large subset of the end loop segments define at least one radial shift adjustment per end loop segment to form a cascade winding.

16. The stator assembly according to claim 14, wherein the width of the insulation member is approximately equal to or less than 0.18 mm.

17. The stator assembly according to claim 14, wherein the slot wire segments are substantially radially inserted through the slot openings of the core slots.

18. A stator assembly for a dynamoelectric machine, comprising:

a generally cylindrically-shaped stator core having a plurality of circumferentially spaced radially-extending core teeth, adjacent core teeth defining core slots in a surface thereof and each having a respective radial depth, an axial length and a core slot opening, the core slots extending between a first and a second axial ends of the stator core; and a stator winding having slot wire segments received by the core slots and the slot wire segments of the stator winding and the core slots being electrically insulated from one another by insulation members, wherein the core slot openings have a width that allow for a radial insertion of the slot wire segments, and the ratio of the width of the slot openings to the width of the slot wire segments, including any slot wire segment insulation, is less than 1.33, the slot wire segments are aligned in a radial row in a plurality of core slots, and have a substantially rectangular cross section, wherein the stator winding consists of n phase conductors and the phase conductors are formed having corresponding slot wire segments located in the core slots and end loop segments that connect two adjacent slot wire segments belonging to the at least one of the n phases, a substantially large subset of the end loop segments define at least one radial shift adjustment per end loop segment to form a cascade winding, and wherein the width of the insulation member is approximately equal to or less than 0.18 mm.

19. The stator assembly according to claim 18 wherein the slot wire segments are substantially radially inserted through the slot openings of the core slots.

20. A stator assembly for a dynamoelectric machine, comprising:

a generally cylindrically-shaped stator core having a plurality of circumferentially spaced radially-extending core teeth, adjacent core teeth defining core slots in a surface thereof and each having a respective radial depth and axial length, the core slots extending between a first and a second axial ends of the stator core; and a stator winding having slot wire segments received by the core slots and the slot wire segments of the stator winding and the core slots being electrically insulated from one another by insulation members, the stator winding including n phase conductors wherein at least one of the n phases is formed from a continuous conductor having corresponding slot wire segments located in the core slots and end loop segments that connect two adjacent slot wire segments belonging to the at least one of the n phases;

wherein the plurality of core teeth having projections that define slot openings between adjacent core teeth, wherein the core slot openings have a width that allow for a radial insertion of the slot wire segments, and the width of the slot openings is less than a width of a main portion of the core slots, and wherein the slot wire segments are aligned in a radial row in a plurality of core slots and whose widths, including corresponding slot wire segment insulation, the core slots without deforming or shifting.

21. The stator assembly according to claim 20 wherein a width of the projections is substantially equal to a width of the insulation member.

22. The stator assembly according to claim 20 wherein the slot wire segments have a substantially rectangular cross section.

23. The stator assembly according to claim 20 wherein the insulation member is made from one of a paper and a paper composite having electrically insulating properties.

24. The stator assembly according to claim 20, wherein the insulation member is a coating which is applied to the inner surface of the core slots.

25. The stator assembly according to claim 20, wherein the stator winding is varnished to fixedly or adhesively be bonded to the core slots.

26. The stator assembly according to claim 20, wherein the core slots are rectangular shaped in cross section from a back end of the core slots to a radial outer edge of the projections.

27. The stator assembly according to claim 20 wherein a width of one of the projections is less than the width of the insulation member.

28. The stator assembly according to claim 20 wherein the slot wire segments are substantially radially inserted through the slot openings of the core slots.

29. The stator according to claim 20, wherein a substantially large subset of the end loop segments define at least one radial shift adjustment per end loop segment to form a cascade winding.

* * * * *